United States Patent [19]
Kapolyi et al.

[11] 3,776,717
[45] Dec. 4, 1973

[54] METHOD FOR PROCESSING OF RED MUD

[75] Inventors: Laszlo Kapolyi, Budapest; Ferenc Lazar, Tatabanya; Bela Galauner, Tatabanya; Laszlo Dzsida, Tatabanya; Gyorgy Vamos, Tatabanya; Laszlo Wagner; Alfred Pogany, both of Budapest, all of Hungary

[73] Assignee: Tatabanyai Szenbanyak, Tatabanya, Hungary

[22] Filed: Dec. 2, 1971

[21] Appl. No.: 204,216

[30] Foreign Application Priority Data
Dec. 4, 1970   Hungary .......................... TA-1907

[52] U.S. Cl. .................................... 75/38, 106/103
[51] Int. Cl. .......................................... C21b 13/08
[58] Field of Search .......................... 75/24, 30, 38; 106/51, 103, 117; 423/121

[56] References Cited
UNITED STATES PATENTS
2,981,600   4/1961   Porter ................................ 423/121
2,438,488   3/1948   Anderson et al. .............. 106/100 X OTHER PUBLICATIONS
Miller et al. Chem. Abstracts, 54 13573f, 1960.

Watanabe, Chem. Abstracts, 55 P879f, 1960.

Encyclopedia of Chem. Tech. Kirk–Othmer, Vol. 4, 2nd Ed. TP9E68; 1964, (pp. 694–695 Slag Cements relied on).

*Primary Examiner*—L. Dewayne Rutledge
*Assistant Examiner*—M. J. Andrews
*Attorney*—Gabriel P. Katona

[57] ABSTRACT

The red mud by-product of aluminum manufacture is processed by first removing its alkali metal content by causticization of a slurry thereof with burnt lime in the presence of humic acid or derivative thereof. From the remaining solids iron can be recovered such as by reduction and smelting, where the humic acid-containing ingredient, a soft coal, can be utilized for its carbon content. From the remaining slag of the smelting either an aluminaceous refractory cement is prepared or the solids are converted into a spontaneously disintegrating dicalcium silicate for which the aluminum content can be recovered. In the latter case the last remaining solids can be used in the manufacture of portland cement.

9 Claims, 1 Drawing Figure

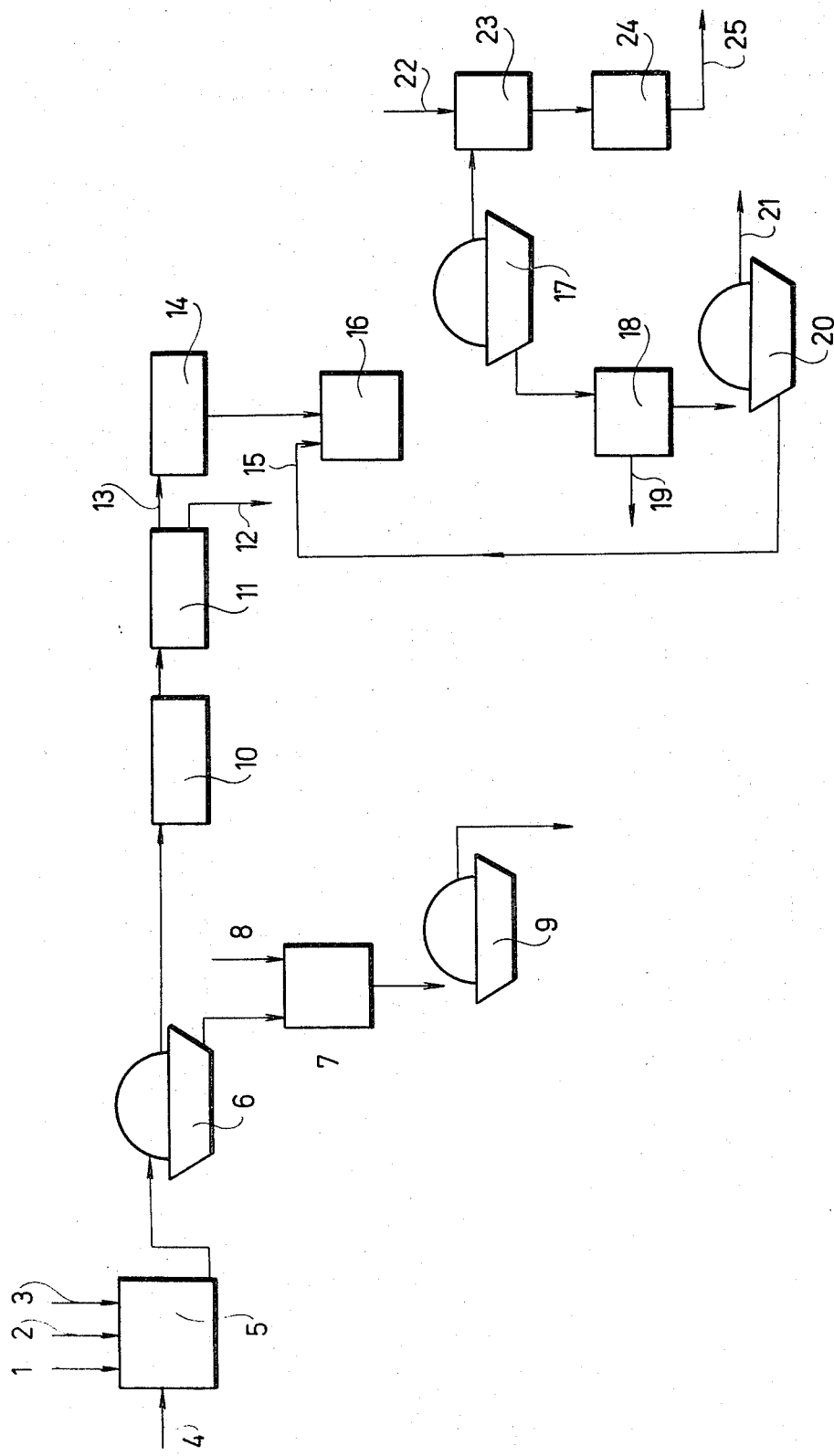

METHOD FOR PROCESSING OF RED MUD

The present invention relates to a process for the treatment of red mud obtained in the production of aluminum. More particularly, the process of the present invention relates to the reduction of the chemically combined alkali metal in the red mud, for recovery of its iron and aluminum content and for utilization of the remainder in the manufacture of cement.

Red mud is a heretofore useless by-product of bauxite processing. This material is usually collected in large, space-consuming waste piles in the vicinity of aluminum-manufacturing plants. Since red mud can typically contain 35 – 50 percent ferric oxide and 6 – 10 percent sodium oxide, solids basis, it could provide a desirable source of raw material even for the recovery of the sodium alone. After the removal of the sodium content other valuable ingredients can also be recovered, because the presence of sodium prevents the recovery of the other components.

Prior art efforts for the economical utilization of alkali metal-containing red mud included a reduction thereof, followed by smelting. The resulting steel was of a poor grade, and its high sodium content prevented the utilization of the slag remaining after the smelting. Furthermore, the sodium vapors which formed during the smelting, penetrate the interstices of the firebricks in the smelting furnaces, resulting in a high degree of refractory corrosion and premature destruction of the kilns.

Hence, the condition for economical, large, industrial scale utilization of red mud is the separation of the alkali metal components to permit recovery of possibly all of its other components. It is known partially to recover sodium oxide from red mud by treatment with caustic lime to obtain sodium hydroxide. In this procedure the red mud by-product of the Bayer bauxite process is slurried with 6 – 12 percent burnt lime, and when heated to 85° – 100° C even after a period of 4 – 8 hours reaction time only a 10 – 25 percent recovery can be obtained. As the lime concentration is increased the recovery of sodium hydroxide increases only to a point beyond which no increase in the recovery will occur. This is because the sodium - lime reaction is reversible and as sodium hydroxide is formed it suppresses the completion of the reaction. This means that after the caustic treatment the red mud still contains appreciable amounts (3 – 7 percent) of sodium oxide in the form of sodalite or other chemical combinations. On the other hand, economical treatment of red mud would require that the alkali metal content should be under 1.5 percent. This cannot be accomplished with prior art techniques.

It is an object of the invention to recover the alkali metals contained in red mud by reducing the alkali metal concentration to a value below 1.5 – 1 percent by weight of solids, recovering the iron content of the thus obtained alkali-poor material and then utilising the iron-and alkali-poor material for directly manufacturing high-alumina refractory cements or to obtain a material of high dicalcium silicate content which will spontaneously disintegrate and from which aluminum can be leached out and, finally, the remainder can be used for the manufacturing of portland cement. Also valuable fertilizer materials can be obtained from by-products of the process of the present invention.

In accordance with the invention a mixture of red mud, burnt lime and humic acid and/or derivatives of humic acid is slurried in an aqueous medium. The suspension is intensively agitated between about 80° and about 100° C for a period of from about 1 to about 6 hours. By that time a large proportion of the alkali metals of the red mud goes into solution as alkali humates which can either be directly utilised or converted for use into hydroxides or carbonates. Then the remainder is subjected to reduction and smelting to recover its iron content. Thereafter a clinker is formed from the remaining material, while optionally adjusting its calcium content to desirable levels, so that the resulting dicalcium silicate, upon cooling, will spontaneously disintegrate to permit easy extraction of the aluminate content thereof. The remainder can be finally utilised for the production of portland cement.

The present invention is based on the recognition that humic acids promote the causticisation of red mud, because the physically inseparable, chemically bound sodium ions liberated during causticisation, will form poorly dissociating water soluble humates. Thus the reaction equilibrum is shifted in a desirable direction which enables a more complete removal of the sodium oxide and its conversion to various humic acid derivatives.

Suitably brown coals such as lignites can be used as the humic acid-containing ingredient. These not only provide the humic acid needed for forming its sodium derivatives, but will also furnish the carbon needed for the reduction of the iron content of the red mud. Other soft coal varieties such as peat coal, which contain humic acid as well as carbon, can also be used in accordance with this feature of the present invention.

The process is described below in greater detail, with reference to the schematic drawing which is an illustration of a preferred embodiment of the invention.

Burnt lime (1) and a coal containing humic acid or a humic acid derivative (2) are ground and added to the red mud (3). The solids are slurried in water (4) and then intensively agitated in a mixer (5) for a period of from 1 to about 6 hours at 80° – 100° C. During this treatment the burnt lime causes causticisation whereby the sodium ions which become free are converted by the humic acid into sodium derivatives thereof and are thus maintained in a water soluble form. The solution containing the sodium humates and possible other dissolved ingredients is separated in a suitable apparatus (6) from the water-insoluble remainder of the red mud-coal-calcined limestone mixture. In another apparatus (7) acid (8) is added to precipitate the humic acids which are recovered with the aid of a separator (9). The substantially sodium-free solids are fed to a kiln, suitably a rotary kiln (10) where at 700° – 1,200° C the carbon content of the solid remainder brings about a reduction of the iron oxide content of the red mud. The reduction products are fed into a smelting oven (11) from where the molten iron (12) is recovered by tapping from the remainder which is present in the form of substantially sodium-free slags (13). These are placed into a cooling container (14). If the starting composition of the process was properly proportioned, the slags are mainly constituted of dicalcium silicate which, during cooling, will undergo a modification through the $\beta$ form to the $\gamma$ form while disintegrating into small particles. The aluminum content of the powder is leached out with sodium carbonate (15) in a tank (16). The aluminate solution is separated in a filter (17) and is fed into a precipitator (18) where aluminum hydroxide is precipitated with the aid of $CO_2$ (19). The hydrate (21) is separated in a filter (20) from the mother liquor (15) which is recirculated to the tank (16) to the solid remainder of the leached out powdered slag. The leached out slag remainder is recovered in a filter (17), can be optionally mixed with additional burnt lime (22) in a homogeniser (23) from where it is fed into a rotary kiln (24) where it serves as a starting material in the manufacture of cement clinker (25).

Alternatively, if the manufacture of higher alumina-containing refractory cement is desired, then at the outset of processing burnt lime is added to the red mud in an amount sufficient that the molten slag itself which is left behind after the molten iron is tapped from the smelting oven (11) is finished, to provide such a refractory cement merely by cooling and grinding.

The present invention is further illustrated by the following examples.

EXAMPLE 1.

An aqueous slurry is prepared from 100 kg (solids basis) red mud, 35.3 kg of burnt lime having a 95 percent CaO content, and 25 kg of a 3,500 calorie coal, is stirred at 98° C for a period of 3 hours. The starting materials had the following composition (in weight percent):

|  | $SiO_2$ | $Al_2O_3$ | $Fe_2O_3$ | $Na_2O$ | CaO | MgO | Other | Ign. loss |
|---|---|---|---|---|---|---|---|---|
| Red mud | 8.6 | 13.2 | 41.2 | 10.1 | 2.8 | 2.5 | 10.6 | 11.0 |
| Coal ash | 43.2 | 30.7 | 8.9 | 0.0 | 7.4 | 2.0 | 5.8 | 2.0 |

After separation and washing of the remaining solid material it was found to contain 1.2 percent $Na_2O$, based on the starting red mud solids. 10 kg coke is added to the substantially sodium-free intermediate product for smelting as a result of which 27.5 kg iron was recovered. The slag which remained after smelting spontaneously disintegrated upon cooling into a fine powder which was treated at 70° C with a 60 g/l $Na_2CO_3$ solution. From the filtrate, after carbonizing and calcination, 11.4 kg $Al_2O_3$ was recovered. The composition of the solid remainder of the last filtration was adjusted by mixing it with 20 kg limestone and the mixture was sintered in a tubular kiln. 81 kg cement clinker was obtained, having a silicate modulus of 2.2 and an aluminate modulus of 2.0.

The initial filtrate obtained in the removal of the sodium content was treated with a dilute acid, whereby 1.2 kg humic acid became liberated and was recovered.

EXAMPLE 2.

An aqueous slurry was prepared from 100 kg (dry basis) of red mud, 40 kg of burnt lime having a 95 percent CaO content, and 25 kg of a 3,500 calorie coal. The oxide analysis of the red mud starting material was (in weight percent):

| | |
|---|---|
| $SiO_2$ | 12.0 |
| $Al_2O_3$ | 15.7 |
| $Fe_2O_3$ | 41.2 |
| $Na_2O$ | 4.6 |
| CaO | 3.3 |
| MgO | 2.5 |
| Other | 5.3 |
| Ign. loss | 10.4 |

After causticisation, filtration and washing as in Example 1, the remaining solids contained 1.0 percent $Na_2O$ based on the dry red mud starting material.

After the addition of 12 kg coke a reduction of the substantially sodium-free solids was carried out whereby 26.9 kg iron was recovered. The remaining slag spontaneously disintergrated into a fine powder upon cooling, which was treated as in Example 1. 13.1 kg alumina was recovered from the filtrate. The composition of the solid remainder of the last filtration was adjusted by mixing it with 10 kg limestone and, after sintering in a tubular oven, 99 kg cement clinker was obtained.

The filtrate of the first step in which the sodium was substantially removed, was treated with a dilute acid, whereupon 1.3 kg pure humic acid was recovered.

We claim:

1. In a method for the processing of red mud wherein the alkali metal concentration thereof is substantially reduced by contacting the red mud with burnt lime and wherein the iron content of the red mud is recovered by reduction of the iron oxides, the improvement comprising contacting the red mud with humic acid together with the burnt lime, whereby alkali metal humates are formed and are then separated from the red mud.

2. The water-soluble method of claim 1, wherein the humic acid is added to the starting material in the form of a coal.

3. The method of claim 1, wherein from about 1.5 to about 2.5 times the stoichiometric equivalent of the alkali metal content in the red mud, of burnt lime is employed.

4. The method of claim 3, wherein from about 2 to about 10 times the stoichiometric equivalent of the alkali metal content in the red mud, of humic acid equivalent-containing raw material is employed.

5. The method of claim 4, wherein the humic acid or humic acid derivative is added to the starting material in the form of a coal.

6. The method of claim 1, wherein an aqueous slurry of burnt lime, humic acid or humic acid derivative-containing material, and red mud is agitated at a temperature above ambient and up to 100° C for a period of from about 1 hour to about 6 hours.

7. A process for the treatment of red mud, which comprises contacting an aqueous slurry of red mud, burnt lime, and a humic acid -containing ingredient, heating the slurry for a period in excess of 1 hour, separating the remaining solids from the solution containing alkali metal humates, reducing the iron oxides in said remaining solids, and recovering the iron by smelting.

8. The process of claim 7, further comprising the steps of cooling and grinding the slag remaining after the smelting, whereby a high alumina-containing refractory cement is obtained.

9. The process of claim 7, further comprising the steps of converting the slag remaining after smelting into a spontaneously disintegrating dicalcium silicate, leaching part or all of the aluminum content from said silicate, and converting the remaining solids into portland cement.

* * * * *